(12) United States Patent
Goldmann et al.

(10) Patent No.: US 11,833,703 B2
(45) Date of Patent: Dec. 5, 2023

(54) PROCESS FOR PRODUCING FOAM PANELS FOR THE PRODUCTION OF FOAM FILMS

(71) Applicant: Evonik Operations GmbH, Essen (DE)

(72) Inventors: Felix Goldmann, Griesheim (DE); Thomas Richter, Darmstadt (DE); Matthias Alexander Roth, Griesheim (DE); Florian Becker, Darmstadt (DE); Jorge Manuel Pinto, Darmstadt (DE)

(73) Assignee: Evonik Operations GmbH, Essen (DE)

( * ) Notice: Subject to any disclaimer, the term of this patent is extended or adjusted under 35 U.S.C. 154(b) by 0 days.

(21) Appl. No.: 18/250,824

(22) PCT Filed: Oct. 12, 2021

(86) PCT No.: PCT/EP2021/078108
§ 371 (c)(1),
(2) Date: Apr. 27, 2023

(87) PCT Pub. No.: WO2022/089931
PCT Pub. Date: May 5, 2022

(65) Prior Publication Data
US 2023/0302676 A1 Sep. 28, 2023

(30) Foreign Application Priority Data
Oct. 29, 2020 (EP) .................................. 20204645

(51) Int. Cl.
*B26D 3/00* (2006.01)
*C08J 9/38* (2006.01)

(52) U.S. Cl.
CPC .............. *B26D 3/006* (2013.01); *C08J 9/38* (2013.01); *C08J 2379/08* (2013.01)

(58) Field of Classification Search
CPC ............ B29C 44/005; B29C 45/14795; B29C 66/727; B29C 66/81457; B29C 70/02; B29C 70/026; B29C 70/086; B29C 70/603; B29C 70/68
See application file for complete search history.

(56) References Cited

U.S. PATENT DOCUMENTS

| | | | |
|---|---|---|---|
| 3,906,137 | A | 9/1975 | Bauer |
| 7,169,339 | B2 | 1/2007 | Stein et al. |
| 7,247,694 | B2 | 7/2007 | Stein et al. |
| 9,212,269 | B2 | 12/2015 | Bernhard et al. |
| 10,207,435 | B2 | 2/2019 | Bernhard et al. |
| 10,279,513 | B2 | 5/2019 | Pinto et al. |
| 10,556,357 | B2 | 2/2020 | Richter et al. |
| 10,619,024 | B2 | 4/2020 | Richter et al. |
| 11,485,832 | B2 | 11/2022 | Traßl et al. |
| 2005/0014918 | A1 | 1/2005 | Stein et al. |
| 2011/0155946 | A1 | 6/2011 | Simpson |
| 2011/0200813 | A1 | 8/2011 | Okura |
| 2013/0041056 | A1 | 2/2013 | Geyer et al. |
| 2013/0108817 | A1 | 5/2013 | Bernhard et al. |
| 2014/0134422 | A1 | 5/2014 | Kraatz et al. |
| 2014/0287321 | A1* | 9/2014 | Kumar ................. H01M 50/489 264/48 |
| 2015/0151496 | A1 | 6/2015 | Kraatz et al. |
| 2015/0174798 | A1 | 6/2015 | Pinto et al. |
| 2015/0361236 | A1 | 12/2015 | Richter et al. |
| 2016/0039986 | A1 | 2/2016 | Zimmermann et al. |
| 2017/0087750 | A1 | 3/2017 | Bernhard et al. |
| 2017/0136665 | A1 | 5/2017 | Bernhard et al. |
| 2018/0215063 | A1 | 8/2018 | Richter et al. |
| 2019/0153186 | A1 | 5/2019 | Richter et al. |
| 2020/0207939 | A1 | 7/2020 | Traßl et al. |
| 2020/0325298 | A1 | 10/2020 | Traßl et al. |
| 2020/0407558 | A1 | 12/2020 | Traßl et al. |
| 2022/0063153 | A1 | 3/2022 | Richter et al. |
| 2022/0126490 | A1 | 4/2022 | Richter et al. |
| 2023/0105032 | A1 | 4/2023 | Traßl et al. |

FOREIGN PATENT DOCUMENTS

| | | |
|---|---|---|
| EP | 1 444 293 | 8/2004 |
| EP | 1 678 244 | 7/2006 |
| EP | 2 653 287 | 10/2013 |
| EP | 3 221 101 | 9/2017 |
| GB | 2448610 | 10/2008 |
| WO | 94/04604 | 3/1994 |
| WO | 03/020804 | 3/2003 |
| WO | 2005/047377 | 5/2005 |

(Continued)

OTHER PUBLICATIONS

Extended European Search Report received for European Patent Application No. 20204645.4, dated May 26, 2021, 5 pages.
International Search report dated Jan. 27, 2022, in PCT/EP2021/078108, 6 pages.
Written Opinion dated Jan. 27, 2022, in PCT/EP2021/078108, 8 pages.
U.S. Pat. No. 7,247,694, Jul. 24, 2007, 2005/0014918, Stein et al.
U.S. Pat. No. 9,212,269, Dec. 15, 2015, 2013/0108817, Bernhard et al.
U.S. Appl. No. 13/812,980, filed Nov. 6, 2013, 2014/0134422, Kraatz et al.
U.S. Appl. No. 14/402,446, filed Nov. 20, 2014, 2015/0151496, Kraatz et al.
U.S. Pat. No. 10,279,513, May 7, 2019, 2015/0174798, Pinto et al.
U.S. Appl. No. 14/781,797, filed Oct. 1, 2015, 2016/0039986, Zimmermann et al.

(Continued)

*Primary Examiner* — Stella K Yi
(74) *Attorney, Agent, or Firm* — Grüneberg and Myers PLLC

(57) ABSTRACT

A process can be used for producing foam panels, for the production of foam films, composed of a polymer having a glass transition temperature $T_g$ of at least 100° C. An average cell diameter of the foam panels measured according to the standard ASTM D 3576 is between 20 μm and 250 μm, and less than 20 cells having a diameter >260 μm are present per m². The elongation at break of the foam is 4%-13% measured according to ASTM D 638.

9 Claims, No Drawings

(56) References Cited

FOREIGN PATENT DOCUMENTS

| WO | 2011/138060 | 11/2011 |
| WO | 2016/078902 | 5/2016 |
| WO | 2022/089931 | 5/2022 |

OTHER PUBLICATIONS

U.S. Appl. No. 14/765,472, filed Aug. 3, 2015, 2015/0361236, Richter et al.
U.S. Appl. No. 15/312,324, filed Nov. 18, 2016, 2017/0087750, Bernhard et al.
U.S. Pat. No. 10,207,435, Feb. 19, 2019, 2017/0136665, Bernhard et al.
U.S. Pat. No. 10,556,357, Feb. 11, 2020, 2018/0215063, Richter et al.
U.S. Pat. No. 10,619,024, Apr. 14, 2020, 2019/0153186, Richter et al.
U.S. Appl. No. 18/003,666, filed Dec. 28, 2022, Traßl et al.
U.S. Appl. No. 16/640,626, filed Feb. 20, 2020, 2020/0207939, Traßl et al.
U.S. Appl. No. 18/063,075, filed Dec. 7, 2022, 2023/0105032, Traßl et al.
U.S. Appl. No. 17/995,030, filed Sep. 29, 2022, Wursche et al.
U.S. Pat. No. 11,485,832, Nov. 1, 2022, 2020/0325298, Traßl et al.
U.S. Appl. No. 16/767,240, filed May 27, 2020, 2020/0407558, Traßl et al.
U.S. Appl. No. 17/423,152, filed Jul. 15, 2021, 2022/0126490, Richter et al.
U.S. Appl. No. 17/310,059, filed Jul. 14, 2021, 2022/0063153, Richter et al.

\* cited by examiner

PROCESS FOR PRODUCING FOAM PANELS FOR THE PRODUCTION OF FOAM FILMS

CROSS-REFERENCE TO RELATED APPLICATIONS

This application is the National Stage entry under § 371 of International Application No. PCT/EP2021/078108, filed on Oct. 12, 2021, and which claims the benefit of priority to European Application No. 20204645.4, filed on Oct. 29, 2020. The content of each of these applications is hereby incorporated by reference in its entirety.

BACKGROUND OF THE INVENTION

Field of the Invention

The invention relates to a process for producing foam panels for the production of foam films consisting of a polymer having a glass transition temperature $T_g$ of at least 100° C., characterized in that the average cell diameter measured according to the standard ASTM D 3576 is between 20 µm and 250 µm and less than 20 cells having a diameter >260 µm are present per m² and the elongation at break of the foam is 4%-13% measured according to ASTM D 638.

Description of Related Art

Rigid foams, for example polymethacrylimide, which is marketed under the product name Rohacell®, may be cut by different processes, similarly to other foams. The standard way of doing this in the case of Rohacell® is by sawing. This comprises horizontal division of thick foam blocks using band saws, thus generating relevant amounts of sawdust. In addition, it is barely possible by this process to obtain thin or very thin sheets or films from the rigid foam. Very thin films are not achievable, if only because of the thickness of the saw blades and the relatively high mechanical stress on the region of the rigid foam to be cut in the course of sawing. Thin sheets having a thickness between 3 and 10 mm are in turn possible only with great material losses and with relevant dust formation, since a saw blade used in sawing has a relevant thickness of at least 2 mm, thus resulting in corresponding material losses. If in turn the saw blade is particularly thin, said blade will sag and lead to high thickness variances in the cut product and/or make cutting of films virtually impossible. If thicker sheets having a thickness of more than 10 mm are to be divided problems likewise arise in the course of sawing since the bending of the region to be cut, which is caused by the thickness of the saw blade, would lead to fracture thereof during the division. This is a problem which occurs especially in the case of very rigid, and thus to some extent brittle, foams.

Flexible foams, for example flexible polyurethane foams, can also be cut by the use of band knives, giving no sawdust as waste product.

Many foams (rigid and flexible foams) can additionally be cut by means of heated tensioned wires. However, there is the possibility here of thermal damage to the material as a result of the hot wire. Moreover, as a result of the finite thickness of the wire, there is also the problem here of material loss or of fracture of thin sheets.

A process for planar division of rigid foams which is suitable for obtaining films or thin sheets is described in U.S. Pat. No. 10,556,357. This process is characterized in that the rigid foam is first flexibilized and then cut with a knife. The foam films described in this IP right exhibit an insufficient elongation at break due to a multiplicity of pinholes.

SUMMARY OF THE INVENTION

Problem

Against the background of the discussed prior art the problem addressed by the present invention was therefore that of providing a process for producing foam panels from which it is possible to provide thin foam films made of a polymer having a glass transition temperature $T_g$ of at least 100° C. having small cell diameters and few pinholes.

The production process for the foam panels shall be suitable in particular for producing foam films from these foam panels in a thickness of less than 3 mm. The division of foam panels shall be effected without chip formation.

Other problems not explicitly discussed here can be derived from the prior art, the description or the exemplary embodiments.

Solution

This problem was solved by providing a process for producing foam panels for the production of foam films consisting of a polymer having a glass transition temperature $T_g$ of at least 100° C., an average cell diameter measured according to the standard ASTM D 3576 between 20 µm and 250 µm and less than 20 cells having a diameter >260 µm per m² and an elongation at break of the foam panels between 4%-13% measured according to ASTM D 638, characterized in that
  A) the foam skin of the foam block is removed and
  B) the remaining portion of the foam block is cut into foam panels having thicknesses between 10 and 135 mm.

DETAILED DESCRIPTION OF THE INVENTION

The foam panels according to the invention are produced from polymers having a glass transition temperature $T_g$ of at least 100° C., preferably at least 140° C., measured according to DIN EN ISO 11357-2. The standard DIN EN ISO 11357-2 (dated July 2014) for plastics describes differential scanning calorimetry (DSC)—Part 2: Determination of glass transition temperature and glass transition activation energy.

The polymers are selected from the group consisting of polyether sulfone, polyphenyl sulfone, polyether ether ketone, poly(meth)acrylimide, polymethyl (meth)acrylate, polyetherimide, polysulfone, polyurethanes, polyethylene terephthalate and mixtures and also copolymers thereof. The term poly(meth)acrylimide (P(M)I) is hereinbelow to be understood as meaning polymethacrylimides (PMI), polyacrylimides (PI) or mixtures thereof. Similar applies for example to polymethyl (meth)acrylate. Accordingly the term polymethyl (meth)acrylate is to be understood as meaning not only polymethyl methacrylate but also polymethyl acrylate and mixtures thereof. The material for the foam core is preferably P(M)I, particularly preferably PMI. Such P(M)I foams are also referred to as rigid foams and exhibit particular strength. The production of P(M)I foams is described for example in EP 3221101. The P(M)I foams are normally produced in a two-stage process: a) production of a cast polymer and b) foaming of this cast polymer.

The cast polymer is produced by first producing monomer mixtures which comprise, as main constituents, (meth)

acrylic acid and (meth)acrylonitrile, preferably in a molar ratio of from 2:3 to 3:2. In addition, it is possible to use further comonomers such as esters of acrylic or methacrylic acid, styrene, maleic acid or itaconic acid or anhydrides thereof or vinylpyrrolidone. However, the proportion of the comonomers should be not more than 30% by weight. It is also possible to use small quantities of crosslinking monomers, e.g. allyl acrylate. However, the amounts should preferably be at most 0.05 to 2.0% by weight.

The mixture for the copolymerization further contains blowing agents which undergo either decomposition or evaporation to form a gas phase at temperatures of about 150° C. to 250° C. The polymerization occurs below this temperature, so that the cast polymer contains a latent blowing agent. The polymerization advantageously takes place in block form between two glass plates. For the production of foamed sheets, this is then followed according to the prior art by the foaming of the cast polymer in a second step at an appropriate temperature. The production of these P(M)I foams is known in principle to the person skilled in the art and can be found by way of example in EP 1 444 293, EP 1 678 244 or WO 2011/138060. Examples of PMI foams include in particular the ROHACELL® line from Evonik Industries AG, Germany. Acrylimide foams can be considered as analogous to the PMI foams in respect of production and processing. However, for toxicological reasons, these are substantially less preferred compared to other foam materials.

The density of the rigid foam material can be selected relatively freely. P(M)I foams may be employed in a density range of for example 20 to 320 kg/m$^3$, preferably of 25 to 250 kg/m$^3$. It is particularly preferable to employ a PMI foam having a density between 30 and 200 kg/m$^3$.

The foams described here are produced in foam blocks. These foam blocks have different thicknesses according to the employed polymers and the achieved density.

It was found that it is particularly advantageous to use only the foam from a particular region of the foam block. It has been found that removing the foam skin/surface of the foam block results in foam panels having exceptional mechanical properties.

It is preferable when 3 mm, particularly preferably 5 mm, very particularly preferably 10 mm and especially preferably 15 mm of the surface/the foam skin of the foam block is removed. The remaining material has a better homogeneity of cell size and elongation at break and thus suitability for processing into foam panels.

The remaining portion of the foam block is cut into foam panels having thicknesses between 10 and 135 mm, preferably between 60 and 125 mm, particularly preferably to a thickness of 75 mm.

Various methods for cutting foam panels from foam blocks are known. Cutting is preferably effected using a laser, band knife or band saw.

The foam panels produced according to the invention are especially suitable for producing foam films.

The foam panels may be used to produce foam films of particularly low thickness. Thin foam films having a thickness between 0.05 and 3 mm are producible. It is preferable to obtain foam film thicknesses between 0.15 and 1 mm.

A particular problem in the production of foam films are pinholes. In this context the term pinholes refers to relatively large cells which occur at the surface of the film and result in a reduction in strength. In extreme cases the cell size is greater than the thickness of the film, thus resulting in a hole in the film.

According to the invention the foam films have an average cell diameter of the foams between 20 μm and 250 μm, preferably between 50 μm and 220 μm, particularly preferably between 80 to 200 μm, measured according to the standard ASTM D 3576. The standard ASTM D 3576 (2015 edition) is used to determine the cell size of hard foams.

To obtain the desired mechanical properties, in particular elongation at break, only less than 20 cells having a diameter >260 μm are present per m$^2$. It is preferable when only less than 15 cells having a cell diameter >260 μm are present per m$^2$.

Preference is given to foam films having an elongation at break between 4% and 30%, particularly preferably between 5% and 10%, measured according to ASTM D 638 (2014 edition). ASTM D 638 corresponds to ISO 527-1 and is a standard test method for determining tensile properties of plastics.

Specifically particularly rigid foams having a high stiffness and brittleness, for example rigid P(M)I foam, can suffer the problem that the slabs fracture in the course of cutting, especially as a consequence of the wedge-shaped cross section of the blade.

The foam having particular properties, such as high breaking elongation and cell structure, is suitable for splitting into thin layers. The splitting of rigid foam is a very efficient process for producing thin layers used for example in loudspeakers for smartphones. Due to the mechanical demands of the splitting process (deflection of the cut film at the cutter bar) a high breaking elongation of the foam is advantageous for process stability and achievable layer thicknesses. Since the cut foam film is adhesively bonded to a very thin layer of aluminium foil, through which relatively coarse and inhomogeneous cells can become apparent, the finest and most homogeneous possible cell structure is required.

In one variant of the process the splitting of the still-heated rigid foams is carried out directly after the foaming operation in an oven or in a heating press.

With regard to the arrangement of the knife too, there are various embodiments.

In a preferred embodiment, the rigid foam slab is moved at right angles to the cutting surface of the knife, while the knife moves only at right angles to the transport direction of the rigid foam slab. Alternatively, albeit less preferably, the knife in the cutting operation is moved along a fixed rigid foam. It is also possible that the knife and the rigid foam have opposite directions of movement, in which case the knife in the two latter variants can effectively be moved at right angles to the rigid foam in addition to the support of the cutting operation.

In the case of movement of the knife at right angles, there are again two variants. Firstly, the knife can be moved back and forth. However, it is preferable to use a band knife. Such a band knife is moved in a circuit in one direction at right angles to the cutting direction and is generally guided and driven by means of at least two deflecting rollers. Band knife systems are commercially available.

In a particular embodiment several pieces, for example in the form of films or thin sheets, are cut from the rigid foam in one movement by means of a plurality of knives arranged in succession. These may especially be several band knives arranged in series. It is thus possible to cut a plurality of workpieces from one block in one operation in a very efficient manner.

Alternatively or in addition the film may subsequently be covered with at least one outer layer. These outer layers may, for example, be composite materials, metal or wood. This makes it possible to realize for example sandwich materials employed in lightweight construction. Alternatively, the outer layers may simply be merely a protective film that can be removed again or a decorative layer. Especially the application of very thin aluminium foils is of interest.

Great advantages of the present invention are that the generation of waste in the form of sawdust during cutting of rigid foams is virtually avoided and that thermal damage to the rigid foam surfaces is ruled out. This makes it possible to limit material losses and the process is altogether more economical than processes of the prior art.

The thin foam films in principle have a very broad field of application. Foam films may be used for example as membranes, in particular in loudspeakers, mobile music players or headphones. The use thereof for decorative purposes, for example for surface finishing of articles, is also conceivable.

The invention claimed is:

1. A process for producing foam panels for the production of foam films, consisting of at least one polymer having a glass transition temperature $T_g$ of at least 100° C., an average cell diameter measured according to the standard ASTM D 3576 between 20 μm and 250 μm and less than 20 cells having a diameter >260 μm per m$^2$, and an elongation at break of the foam panels between 4%-13% measured according to ASTM D 638, the process comprising:
A) removing a foam skin of a foam block, and
B) cutting a remaining portion of the foam block into foam panels having thicknesses between 60 and 135 mm.

2. The process according to claim 1, wherein the at least one polymer has a glass transition temperature of at least 140° C.

3. The process according to claim 1, wherein the at least one polymer is selected from the group consisting of polyether sulfone, polyphenyl sulfone, polyether ether ketone, poly(meth)acrylimide, polymethyl (meth)acrylate, polyetherimide, polysulfone, polyurethane, polyethylene terephthalate, and mixtures and copolymers thereof.

4. The process according to claim 1, wherein the average cell diameter of the foam panels is between 50 μm and 220 μm.

5. The process according to claim 1, wherein less than 15 cells having a cell diameter >260 μm are present per m$^2$ of the foam panel.

6. The process according to claim 1, wherein the elongation at break of the foam panel is 5%-10%, measured according to ASTM D 638.

7. The process according to claim 1, wherein the foam skin of the foam block in A) has a thickness of 3 mm.

8. The process according to claim 1, wherein the foam panels in B) are cut using a band knife or band saw.

9. The process according to claim 4, wherein the average cell diameter of the foam panels is between 80 μm to 200 μm.

* * * * *